(12) United States Patent
Morihisa

(10) Patent No.: US 9,113,082 B2
(45) Date of Patent: Aug. 18, 2015

(54) IMAGING DEVICE

(75) Inventor: Taijiro Morihisa, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/122,070

(22) PCT Filed: May 23, 2012

(86) PCT No.: PCT/JP2012/063831
§ 371 (c)(1),
(2), (4) Date: Nov. 25, 2013

(87) PCT Pub. No.: WO2012/161344
PCT Pub. Date: Nov. 29, 2012

(65) Prior Publication Data
US 2014/0092275 A1 Apr. 3, 2014

(30) Foreign Application Priority Data

May 25, 2011 (JP) .................................. 2011-117370
Mar. 23, 2012 (JP) .................................. 2012-066553

(51) Int. Cl.
| | | |
|---|---|---|
| H04N 5/232 | (2006.01) | |
| G02B 7/36 | (2006.01) | |
| H04N 5/225 | (2006.01) | |
| G03B 13/20 | (2006.01) | |
| G03B 13/36 | (2006.01) | |

(52) U.S. Cl.
CPC ............ *H04N 5/23293* (2013.01); *G02B 7/365* (2013.01); *G03B 13/20* (2013.01); *G03B 13/36* (2013.01); *H04N 5/2258* (2013.01); *H04N 5/23212* (2013.01)

(58) Field of Classification Search
CPC .................................................. H04N 5/23212
USPC .............. 348/262, 211, 11, 345, 47; 396/327, 396/236, 50
See application file for complete search history.

(56) References Cited

U.S. PATENT DOCUMENTS

2006/0204122 A1  9/2006  Onozawa
2008/0158346 A1* 7/2008  Okamoto et al. ................ 348/47
(Continued)

FOREIGN PATENT DOCUMENTS

| CN | 102045510 A | 5/2011 |
|---|---|---|
| JP | 11-341331 | 12/1999 |

(Continued)

OTHER PUBLICATIONS

International Search Report Issued Aug. 28, 2012 in PCT/JP2012/063831 Filed on May 23, 2012.

(Continued)

*Primary Examiner* — Joel Fosselman
(74) *Attorney, Agent, or Firm* — Oblon, McClelland, Maier & Neustadt, L.L.P.

(57) ABSTRACT

An imaging device determines an in-focus position by contrast autofocus. The device includes a first optical system including a first lens and a first image sensor, a second optical system including a second lens and a second image sensor, a signal processing unit to read an image signal from at least one of the first image sensor and the second image sensor and generate an image for display, and a display unit to display the generated image. In the contrast autofocus, the signal processing unit reads a part of the image signal from the first image sensor and calculates a contrast value based on the read part of the image signal, and generates the image for display from the image signal read from the second image sensor.

9 Claims, 6 Drawing Sheets

(56) References Cited

U.S. PATENT DOCUMENTS

| | | |
|---|---|---|
| 2008/0218611 A1 | 9/2008 | Parulski et al. |
| 2009/0244312 A1 | 10/2009 | Nakagawa |
| 2011/0075018 A1 | 3/2011 | Kohama |
| 2011/0090393 A1 | 4/2011 | Kawarada |
| 2012/0019708 A1 | 1/2012 | Morihisa et al. |
| 2012/0062780 A1 | 3/2012 | Morihisa |

FOREIGN PATENT DOCUMENTS

| | | |
|---|---|---|
| JP | 2000-175100 | 6/2000 |
| JP | 2003-333409 | 11/2003 |
| JP | 2006-253829 | 9/2006 |
| JP | 2006-293082 | 10/2006 |
| JP | 2009-244431 | 10/2009 |
| JP | 2010-204385 | 9/2010 |
| JP | 2011-085871 | 4/2011 |

OTHER PUBLICATIONS

Extended European Search Report issued Aug. 14, 2014 in Patent Application No. 12789634.8.

Office Action issued May 6, 2015, in Chinese Patent Application No. 201280033921.7 (with English-language Translation).

* cited by examiner

IMAGING DEVICE

CROSS REFERENCE TO RELATED APPLICATION

The present application is based on and claims priority from Japanese Patent Application No. 2011-117370, filed on May 25, 2011 and No. 2012-066553, filed on Mar. 23, 2012, the disclosure of which is hereby incorporated by reference in its entirety.

TECHNICAL FIELD

The present invention relates to an imaging device having an autofocus function (hereinafter, AF function).

BACKGROUND ART

Several types of AF function of an imaging device are known. One of them is contrast autofocus. The contrast autofocus is to move a focus lens of a main optical system having an image sensor, calculate a contrast value of a subject image from the image sensor in each lens moving step, and determine the position of the focus lens with the maximal contrast value as an in-focus position.

There has been a demand for increasing an autofocus speed. A known technique is to heighten the speed at which a subject image is read for calculation of a contrast value and thereby increase contrast AF speed.

To heighten the image read speed, for example, not image data of the entire image area but that of a part of the image area needed for a contrast value calculation is read from the image sensor (hereinafter, partial read process). Assumed that the read speed for the entire image area is 30 fps (30 images per second), the read speed for the partial image area can be 120 fps, for example.

The imaging device includes a main display unit on the back of a body to display a subject image acquired via an optical system. Users can take photos while viewing subject images on the display unit. Further, users can know the optimal shutter timing by visually checking an indication for the completion of AF process superimposed on the subject image. Thus, it is preferable to constantly display a subject image on the display unit during shooting operation.

However, there is a problem in the partial read process that a partially read image is not suitable for the user's visual check and image display may be disordered. In view of this, Japanese Patent No. 4050385 discloses an imaging device to temporarily stop the image display on the display unit during the contrast AF process and resume it after the completion of the process, for example.

Such an imaging device, however, still faces a problem that a subject image may move to outside the display area when the image display is resumed after completion of the AF process since the image display is stopped during the contrast autofocus process in which no image data is read from the entire image area.

SUMMARY OF THE INVENTION

The present invention aims to provide an imaging device which can heighten the contrast AF speed and at the same time continuously display preview images on the display unit while tracking the motion of a subject.

According to one aspect of the present invention, an imaging device which determines an in-focus position by contrast autofocus, includes a first optical system including a first lens and a first image sensor, a second optical system including a second lens and a second image sensor, a signal processing unit configured to read an image signal from at least one of the first image sensor and the second image sensor, and generate an image for display, and a display unit to display the generated image, wherein in the contrast autofocus, the signal processing unit is configured to read a part of the image signal from the first image sensor and calculate a contrast value based on the read part of the image signal, and generate the image for display from the image signal read from the second image sensor.

BRIEF DESCRIPTION OF THE DRAWINGS

Features, embodiments, and advantages of the present invention will become apparent from the following detailed description with reference to the accompanying drawings.

DESCRIPTION OF EMBODIMENTS

Hereinafter, an embodiment of the present invention will be described in detail with reference to the accompanying drawings. Wherever possible, the same reference numbers will be used throughout the drawings to refer to the same or like parts.

First Embodiment

Figure 1A:
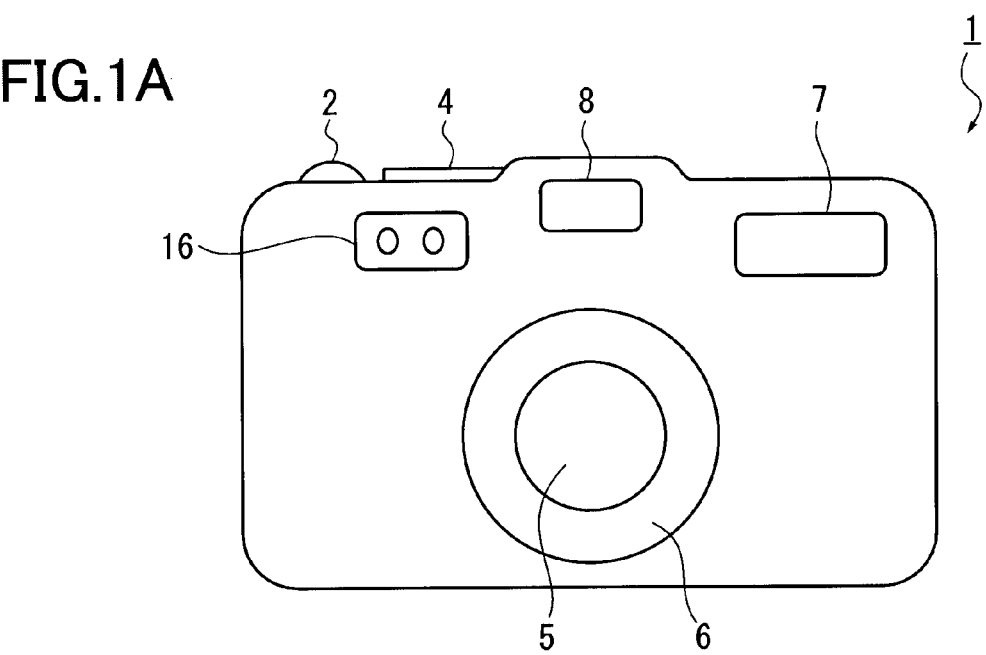
FIGS. 1A to 1C are a front view, a top view, and a back view of an imaging device according to one embodiment of the present invention.
Figure 1B:
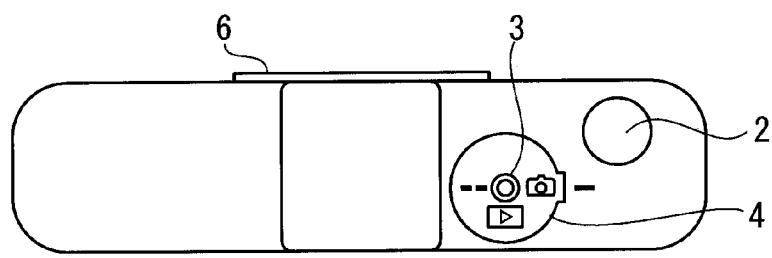
Figure 1C:
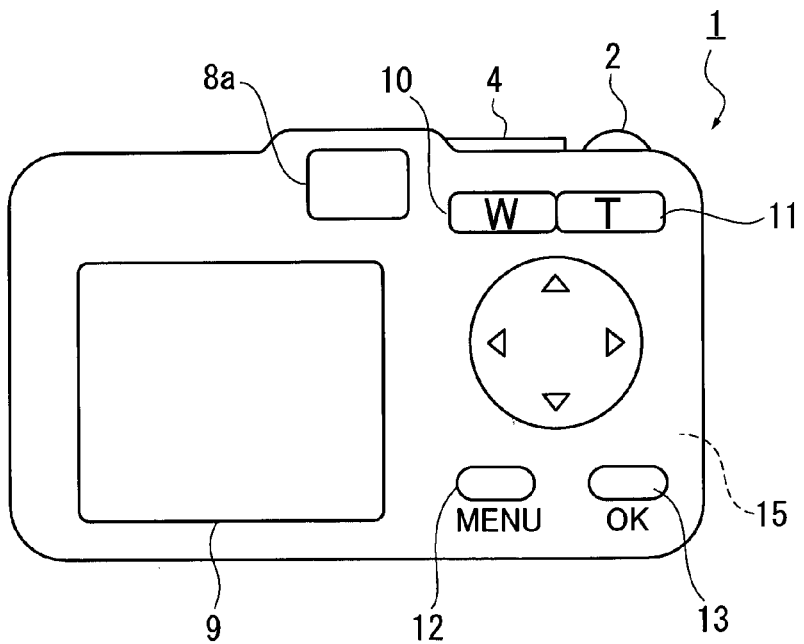

A digital camera as an example of the imaging device according to the present invention is described, referring to FIGS. 1A to 1C. FIGS. 1A to 1C are a front view, a top view, and a back view of a digital camera 1, respectively.

The digital camera 1 in FIG. 1A includes, on the front face, a lens barrel unit 6 including a main optical system having an imaging lens 5, a stroboscopic unit 7, an optical viewfinder 8 to visually check a subject, and a sub optical system 16 for external AF process to measure the distance to a subject.

In FIG. 1B the digital camera 1 includes, on the top face, a shutter button 2, a power button 3 and a switch dial 4 for switching operation modes as shooting mode, reproduction mode.

In FIG. 1C the digital camera 1 includes, on the back face, an LCD 9 as display unit to display a subject image during shooting operation and stored image data in reproduction operation, an eyepiece lens 8a of the optical viewfinder 8, a wide angle (W) zoom switch 10, a telephoto (T) zoom switch 11, a menu button 12 (MENU) to display menus for setting operation parameters of the digital camera 1, and an OK button 13. Also, it includes, on a side, a memory card holder 15 to contain a memory card 14 in which captured images are stored.

Figure 2:
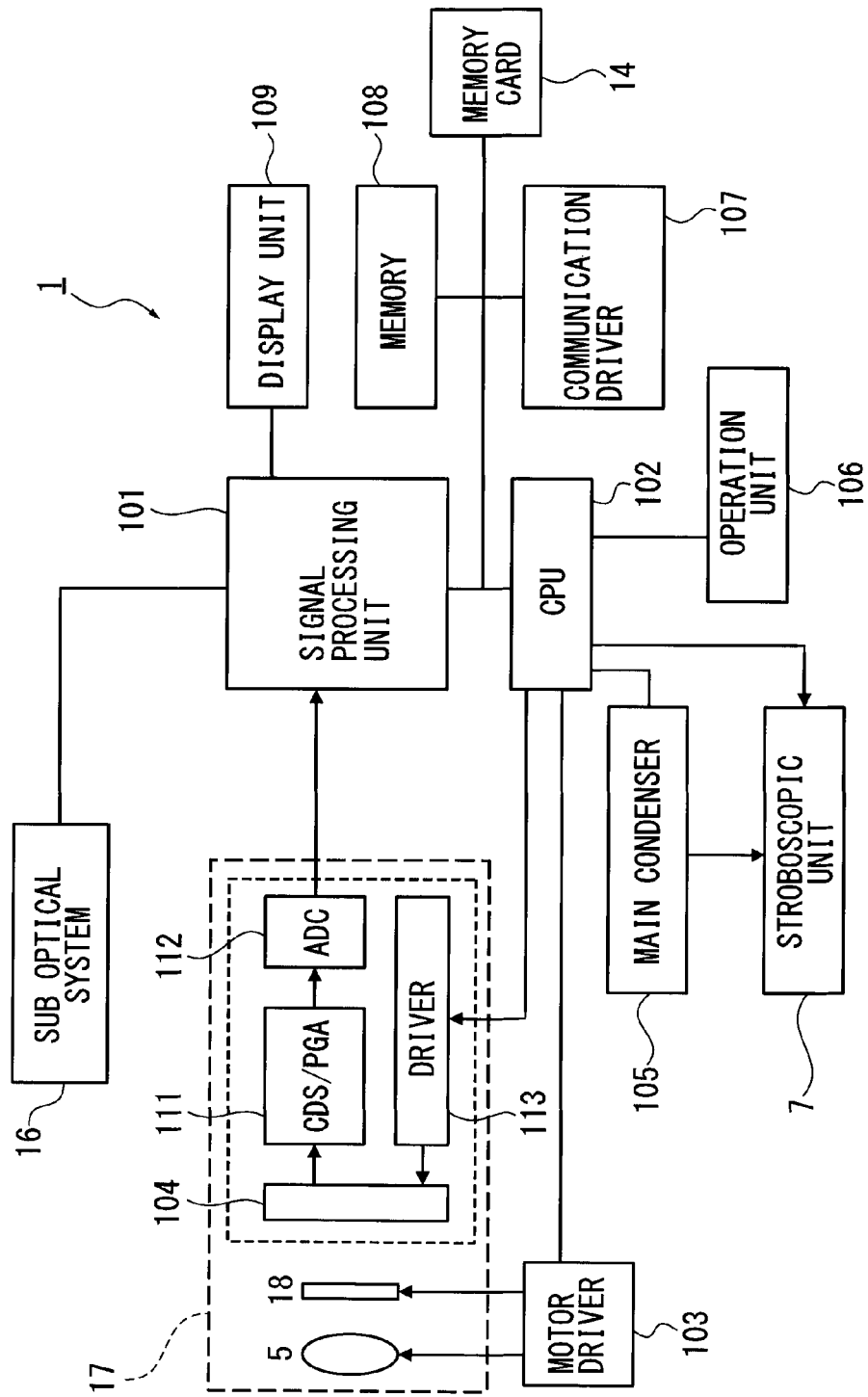
FIG. 2 is a function block diagram of the imaging device in FIG. 1A to 1C.

Next, the inner structure of the digital camera 1 according to the present embodiment is described with reference to FIG. 2. The digital camera 1 includes a CMOS 104 with a light receiving face to form a subject image via the imaging lens 5 and output an electric signal or a digital RGB image signal, a signal processing unit 101 to conduct predetermined signal processing to the electric signal from the CMOS 104, and a diaphragm and mechanical shutter unit 18, a motor driver 103 for the unit 18, and a CPU 102 to control the entire operation of the digital camera 1.

The main optical system 17 as a first optical system includes the imaging lens 5 as a first lens and the CMOS 104 as a first image sensor.

The digital camera 1 further includes a memory 108 in which captured images are stored temporarily, a communication driver 107 to connect the digital camera 1 with an external device via a not-shown communication interface, a detachable memory card 14 in which captured image data are stored, a display unit 109 including the LCD 9 and a display controller to convert image signals from the signal processing unit 101 into signals displayable on the LCD 9, an operation unit 106 including various buttons as the shutter button 2, switch dial 4, menu button 2, OK button 13 for users' manipulation.

Further, the sub optical system 16 as a second optical system includes a sub lens as second lens and a sub image sensor as a second image sensor. The digital camera 1 includes the stroboscopic unit 7 to start and stop light emission under the control of the CPU 102, and a main condenser 105 for strobe light emission.

The sub optical system 16 is mainly used for the external AF process to measure the distance to a subject before the contrast autofocus in the imaging process.

The motor driver 103 for the imaging lens 5 and the unit 18 is controlled by a drive signal from the CPU 102.

The CMOS 104 includes a light receiving face with two-dimensionally arranged pixels to convert an optical image into an electric charge and output it as an electric signal in accordance with an output signal from the driver 113. RGB color filters are arranged over the pixels to output digital RGB image signals or RAW-RGB data in association with the three RGB colors.

Although not shown, the signal processing unit 101 includes a CMOS interface (CMOS I/F) to read the RAW-RGB data from a predetermined image area of the CMOS 104 at a predetermined speed, a memory controller to control data write and read to/from the memory 108, a YUV converter to convert the read RAW-RGB data into YUV data, a resize unit to change the size of image data to one suitable for the size of the display unit or memory format, a display output controller to control the display output of image data, a data compressor to convert image data into one in JPEG form, a medium interface (I/F) for use in image data write/read to/from the memory card, and a controller for the entire system of the digital camera 1 according to a control program stored in a not-shown ROM.

The RAW-RGB data captured by the CMOS I/F, the YUV data converted by the YUV converter and the compressed image data in JPEG form are stored in the memory 108. The YUV data is represented by brightness data (Y), a color difference (U) between the brightness data and blue color data (B) and a color difference (V) between the brightness data and red color data (R).

The sub optical system 16 includes two or more sub image sensors with two-dimensionally arranged pixels to obtain image data of a subject from the sub image sensors, calculate parallax in the image data and calculate the distance to a subject by triangulation.

Next, an example of a preview operation and a still image shooting of the digital camera 1 are described. In the still image shooting mode the digital camera 1 performs the following preview operation.

Upon a user's power-on with the power button 3 and selection of the still image shooting mode with the switch dial 4, the digital camera 1 is operated in the still image shooting mode.

In the digital camera 1 the CPU 102 outputs a control signal to the motor driver 103 to move the imaging lens 5 including a focus lens to a shooting position. The CPU 102 also activates the CMOS 104, signal processing unit 101, and display unit 109.

Then, an optical image is formed on the light receiving face of the CMOS 104 via the imaging lens 5, and an electric signal is output from the CMOS 104 to an A/D converter 112 via a CDA/PGA 111 in accordance with the optical image. The A/D converter 112 converts the electric signal to 12-bit RAW-RGB data. The signal processing unit 101 outputs the converted RAW-RGB data at a predetermined speed via the CMOS I/F and stores it in the memory 108 as SDRAM.

The RAW-RGB is read from the memory 108 at certain timing and converted into YUV data (YUV signal) by the YUV converter to display on the LCD 9 of the display unit 109. The converted YUV data is stored in the memory 108 via the memory controller.

The YUV data is read from the memory 108 to the display unit 109 at certain timing via the memory controller. Thus, a subject image is displayed on the LCD 9 in the preview operation.

During the preview operation, RAW-RGB data corresponding to the entire image area of the CMOS 104 is output as a single frame of YUV data with 1/30 second interval and displayed on the LCD 9. The preview operation continues to display a subject image on the LCD 9 as an electric viewfinder until a full-press or half-press to the shutter button 2 is detected.

In the preview operation a user can visually check a subject image on the LCD 9. The display unit 109 can output image data as a TV video signal to display video on an external TV via a video cable.

During the preview operation the signal processing unit 101 calculates, from the RAW-RGB data, necessary data for imaging such as AF (autofocus) evaluation value, AE (auto exposure) evaluation value or contrast value, and AWB (auto white balance) evaluation value.

The AF evaluation value is an integrated value of the output of a high frequency component filter or an integrated value of brightness difference in neighboring pixels, for example. When the imaging lens 5 captures a subject in focus, the edge portion of the subject exerts highest frequency components. Using this, in autofocus operation the focus lens of the imaging lens 5 is driven to calculate the AF evaluation value at each lens position and determine a lens position with the maximal AF evaluation value as in-focus position.

The AE and AWB evaluation values are calculated from the integrated values of RGB values of the RAW-RGB data. For example, the image frame in association with all the pixels of the CMOS 104 are equally divided into 256 areas (16 by 16 horizontally and vertically) to calculate the integration of the RGB values of each area.

In AE process, the signal processing unit 101 calculates brightness of each equally divided area using the RGB integration values to determine a proper exposure amount on the basis of a calculated brightness distribution and set an exposure condition as electric shutter speed and f-value according to the exposure amount.

Further, in AWB process the signal processing unit 101 determines a control value for the color of a light source of a subject according to a distribution in the RGB integration values, and the YUV converter converts the RAW-RGB data into YUV data while adjusting the white balance thereof.

The AE operation and AWB operation are repeated during the preview operation. Upon a full press to the shutter button, the preview operation is switched to still image shooting operation.

Triggered by the detection of a full press to the shutter button 2, the still image shooting is started. First, the CPU 102 reads an image from the sub optical system 16 to calculate the distance to a subject. Then, it instructs the motor driver 103 to move the focus lens of the imaging lens 5 to a certain position in accordance with the calculated subject distance.

Then, the focus lens is moved in a certain area to calculate the AF evaluation value, and moved to an in-focus position with the maximal AF evaluation value. The above-described AE operation follows. Upon the completion of an exposure, the CPU 102 instructs the motor driver to close the mechanical shutter of the unit 18 and the CMOS 104 to output analog RGB image signals for still image which are converted into RAW-RGB data as in the preview operation.

The converted RAW-RGB data is captured into the CMOS I/F of the signal processing unit 101, converted to YUV data by the YUV converter, and stored in the memory 108 via the memory controller. The YUV data is read from the memory 108 at certain timing, converted by the resize unit to a suitable size for the number of recorded pixels and compressed in JPEG form or else by the data compressor.

The compressed image data is written to the memory 108 again, read therefrom via the memory controller, and stored in the memory card 14 via the medium I/F.

The sub optical system 16 can output image data based on a subject image formed on a not-shown ranging element via a ranging lens. The signal processing unit 101 reads the image data from the sub optical system 16 and calculates the distance to the subject from this image data. The focus lens is moved to a position in accordance with the calculated distance, and moved around the position in question to find an in-focus position. Thereby, the in-focus position can be calculated without moving the focus lens in the entire driving area.

In the present embodiment, the sub optical system 16 cannot perform zoom operation. According to the present embodiment, the angle of view of the image data acquired via the ranging lens of the sub optical system 16 is assumed to be equivalent to that of image data obtained by the main optical system 17 when the zoom lens thereof is positioned at wide angle end.

When the main optical system 17 performs zoom operation, the angle of view of the sub optical system 16 does not coincide with the angle of view of the main optical system 17. In such a case the association between the image data obtained by the sub optical system 16 and that acquired by the main optical system 17 is found by template matching or the like. Then, the distance to a subject is calculated and a later-described sub image is displayed using the image data of an area from the sub optical system 16 associated with that from the main optical system 17.

The digital camera 1 can read preview image data from the sub optical system 16 instead of the main optical system 17. That is, to heighten the AF process speed, it is configured to perform the preview operation using image data from the sub optical system 16 when stopping using image data from the main optical system 17. Thereby, the digital camera 1 can easily track the motion of a subject.

Figure 3:
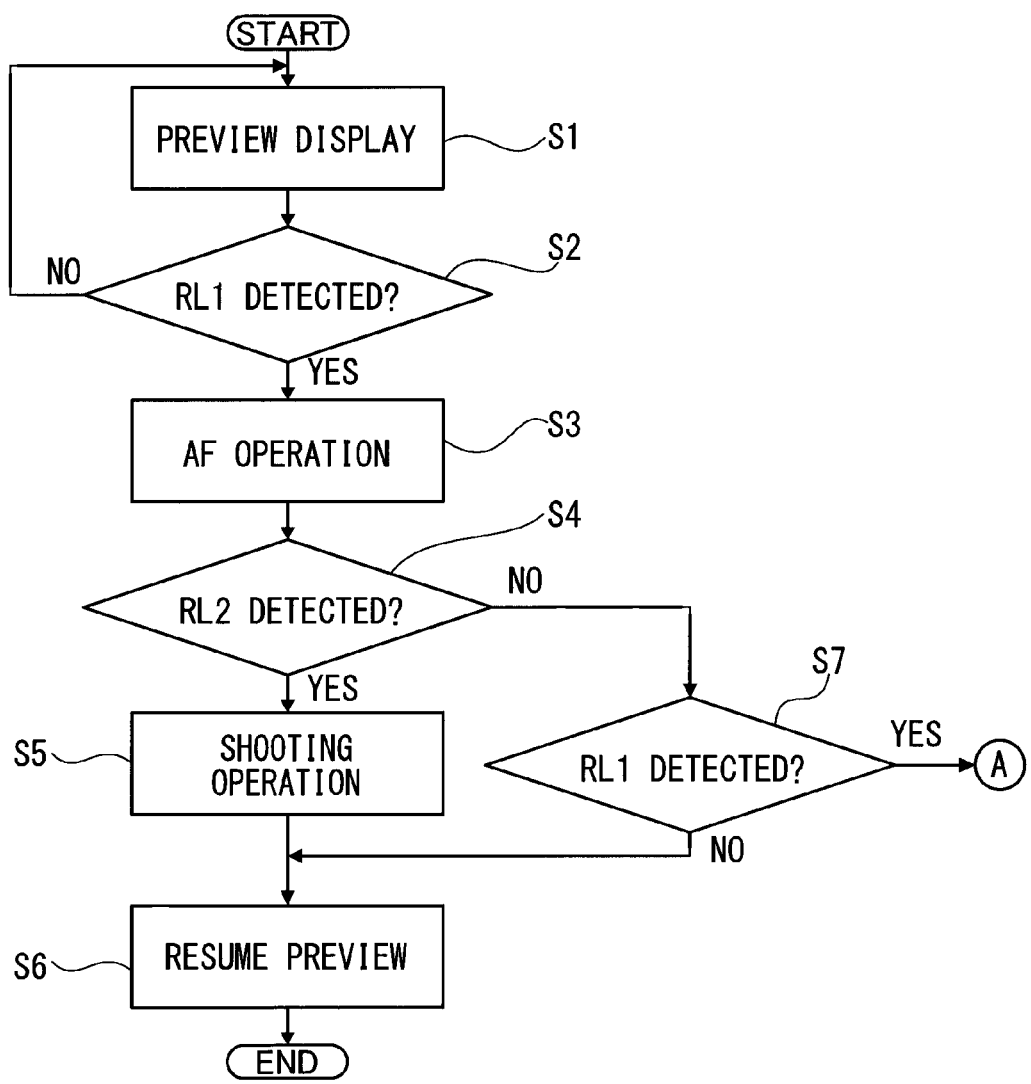
FIG. 3 is a flowchart for the imaging operation executed in the imaging device by way of example.

Herein, an image displayed on the LCD 9 based on image data output from the sub optical system 16 is referred to as a sub image. In the following the sub image display function of the digital camera 1 is described with reference to FIG. 3.

The digital camera 1 starts operating in the shooting mode and displays a preview image in step S1. A determination is made on whether or not the shutter button 2 is half-pressed in step S2. Until the shutter button 2 is half-pressed (RL1), the preview display is continued (No in step S2):

In step S3 the AF process starts upon detection of the half-press to the shutter button 2 (Yes in step S2). The AF process is described in detail referring to FIG. 4.

First, an external AF operation is performed using the sub optical system 16 in step S31, to calculate a parallax in the image data of a subject obtained by the two image sensors of the sub optical system 16 and calculate the distance to the subject by triangulation using the parallax. The CPU 102 moves the focus lens to a position in accordance with the calculated distance in step S31.

Figure 5:
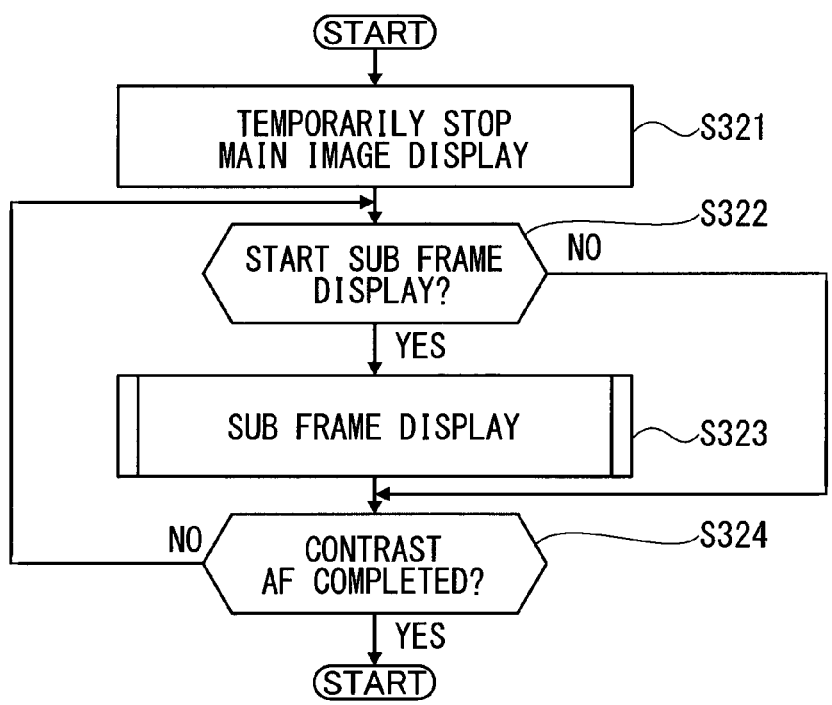
FIG. 5 is a flowchart for the contrast autofocus of the AF process by way of example.

Next, in contrast autofocus operation in step S32, the focus lens position with the maximal contrast value is determined while the focus lens is moved in a certain area around the position found in the step S31. The details of the contrast autofocus operation are described with reference to FIG. 5.

The contrast autofocus operation uses a partial image based on a part of the image signal from the main optical system 17. Because of this, the display of a main image on the LCD 9 is temporarily stopped in S321. The main image refers to an image which is displayed on the LCD 9 during the preview, using image data from the main optical system 17 (step S1 in FIG. 3). In step S321 the image display on the LCD 9 at the start of the contrast autofocus operation in step S32 is frozen or the display of an image read from the main optical system 17 is stopped.

Next, in step S322 a determination is made on whether or not to display a sub frame. If the contrast AF operation based on the image data of not a partial image area but the entire image area is expected to be completed in less than a predetermined period of time, the display of the sub frame is not effective and hard to view since the sub frame is switched over the main frame quickly in a short time. Further, if the contrast AF based on the partial data read from the main optical system 17 is expected to be completed in a predetermined period of time, it is better not to display the sub frame for the purpose of preventing the quick display switchover.

First Example

There are several ways of determining whether to execute the sub frame display in step S322. For example, with the focal length of the main optical system 17 at wide angle end, the number of scan steps for the contrast autofocus is fewer than at telephoto end due to a large depth of field. In this case the termination of the preview of the main image can be ended in a short time so that the display of the sub frame is not necessary since a subject is unlikely to move out of the display area in that time. The switchover to the sub frame rather interrupts the image display. Accordingly, when the focal length of the main optical system 17 is lower than a preset value, the sub frame is not displayed even during the termination of the main image display based on the partial read AF (No in step S322). When the focal length of the main optical system 17 is higher than the preset value, the flow proceeds to sub frame display process in step S323 (Yes in step S322).

Second Example

The operation in step S322 is, in other words, to determine a period of time in which the preview of the main image is stopped, in accordance with the angle of view of the main optical system 17. With the angle of view at wide angle end and a large depth of field, the stop period can be short since the number of scan steps is less than that at telephoto end. Thus, when the angle of view of the main optical system 17 is higher than a preset threshold, the sub frame display is not performed (No in step S322). When the angle of view of the main optical system 17 is lower than the preset threshold, the flow proceeds to step S323 (Yes in step S322).

Third Example

Further, at the number of scan steps being less than a predetermined value, the sub frame display is not started (No in step S322) while at the number of scan steps being more than the predetermined value, the flow proceeds to step S323.

In the digital camera 1 having a scene selection function in which an exposure condition or a shutter speed is selectable from multiple options in shooting mode, it is possible to reduce the number of scan steps for the contrast autofocus according to a selected scene or a result of the most previous AF process.

Therefore, the number of scan steps is not always small at wide angle end nor is it always large at telephoto end. At a small number of scan steps for the contrast AF, the freeze of the main image ends in a short time, so that the display of the sub frame is unnecessary since a subject is unlikely to move out of the display area in the short time. The switchover between the sub frame and the main frame in a short time rather hinders the viewablity of image display.

Accordingly, when the number of scan steps to be executed is smaller than a preset value, the sub frame display is not performed even during the stop of the main image display based on the partial read AF (No in step S322) while when it is larger than the preset value, the sub frame is displayed (Yes in step S322, step S323).

Fourth Example

Further, the display of the sub frame can be determined depending on an estimated contrast AF time. With the estimated contrast time being shorter than a predetermined time, the sub frame display is not started (No in step S322) while with the estimated contrast time being longer than the predetermined time, the flow proceeds to the step S323 (Yes in step S322).

To increase the contrast AF speed, the frame rate for calculating the contrast value has to be heightened. This makes it possible to read images at a high frame rate even if the number of scan steps of the focus lens is large, and to shorten the contrast AF time. Meanwhile, even with a small number of scan steps, the contrast AF time becomes longer at a low frame rate. In general the image sensor can be driven at a high frame rate when the brightness of a subject is high while it has to be driven at a low frame rate when a subject has a low brightness and requires a long exposure time.

Thus, the contrast AF time can be estimated from the number of scan steps and the frame rate of the main optical system 17 to determine whether or not to display the sub frame during the stop of the main frame based on the partial read AF (No or Yes in step S322 and step S323).

As described above, upon determining the non-display of the sub frame based on the above conditions (No in step S322), the flow proceeds to the determination on completion of the contrast AF in step S324. Upon determining the display of the sub frame (Yes in step S322), the flow proceeds to step S323.

Figure 6:
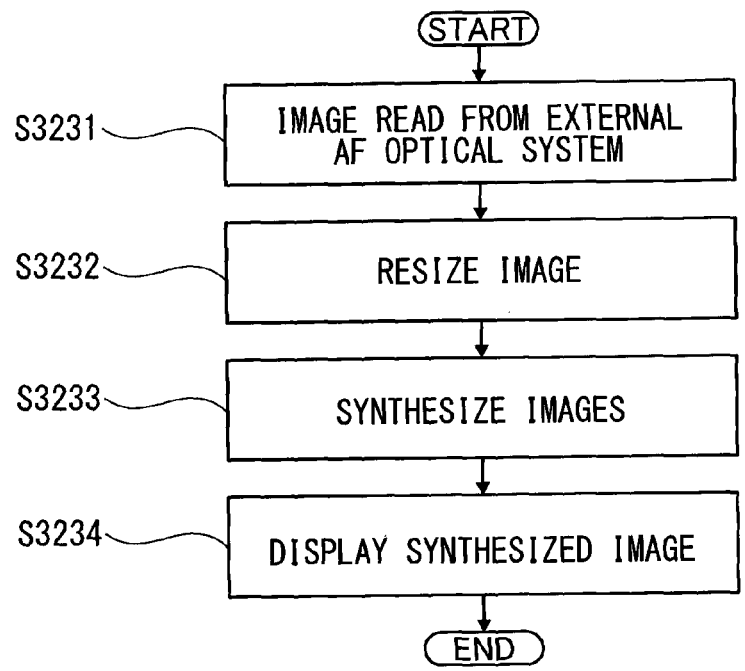
FIG. 6 is a flowchart for the sub frame display process of the contrast autofocus by way of example.

An example of the sub frame display in step S323 is described in detail with reference to FIG. 6. In step S3231 image data is read from the sub optical system 16. The image can be read from either of the two image sensors of the sub optical system 16.

In step S3232 the read image data is converted to one in a size suitable to superimpose over the main image by the signal processing unit 101. The resized image data is referred to as a sub image. In step S3233 the sub image is synthesized with the main image.

In step S3234 the synthesized image is output to the LCD 9. Thus, by superimposing the sub image over the frozen main image on the display, the subject can be tracked and captured in the display area during the contrast AF process.

Figure 7:
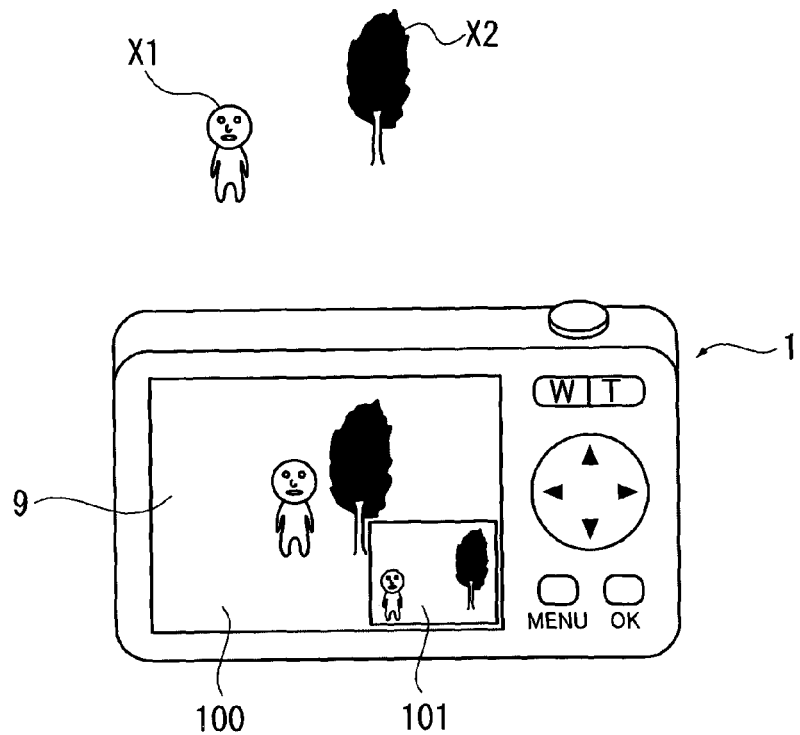
FIG. 7 shows an example of an image on a display unit in the sub frame display process.

Next, an example of the image display on the LCD 9 of the digital camera 1 in the sub frame display process in step S322 is described referring to FIG. 7. FIG. 7 shows an example of the sub frame on the LCD 9, in which a person X1 and a tree X2 are captured as a subject. On the LCD 9 displayed are a main image 100 read via the main optical system 17 and a sub image 101 read via the sub optical system 16.

During the contrast AF operation of the digital camera 1, the main image 100 is placed in a frozen state although the condition of the subject may change in that time. If the person X1 is moving away from the tree X2, for example, the sub image 101 can show the current state of the subject in sequence since it is updated at a predetermined frame rate unlike the frozen main image 100.

Thus, the imaging device according to the present embodiment is able to continue to display the preview images of the subject even during the contrast AF operation.

Next, another example of the image display on the LCD 9 in the sub frame display process in step S323 is described with reference to FIGS. 8A, 8B.

Figure 8A:
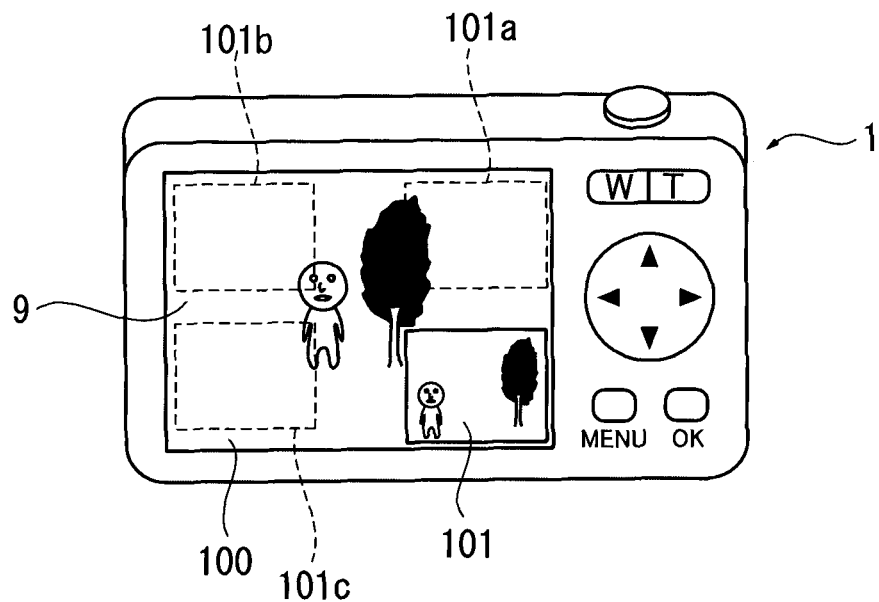
FIG. 8 shows another example of an image on a display unit in the sub frame display process.

In FIG. 8A a user is allowed to select, with a not-shown setting menu, a display position of a sub image from positions 101a (top right), 101b (top left), 101c (bottom left). By setting the display position of the sub image, a synthesized image is generated in the image synthesis process in step S3233.

Figure 8B:
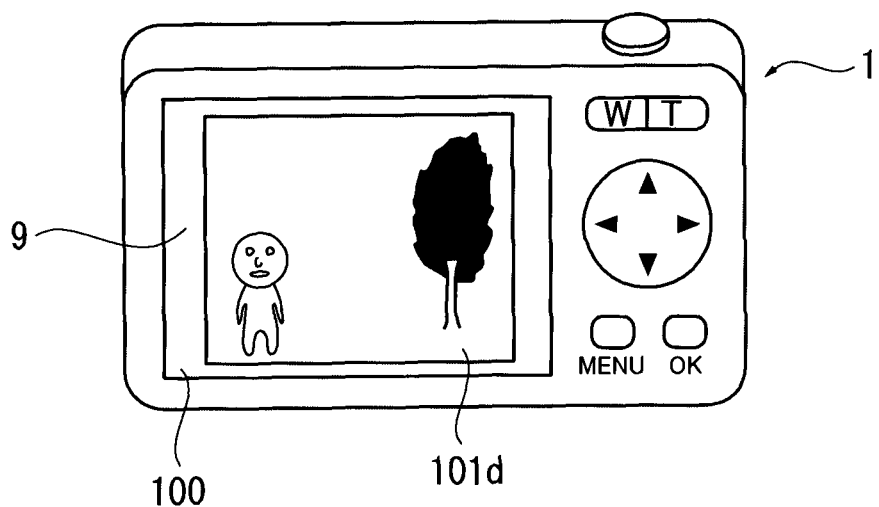

As shown in FIG. 8B, a sub image 101d can be almost as large as the main image 100. Also, only the sub image 101 can be displayed without the main image 100.

Returning to FIG. 5, in step S324 a determination is made on whether or not the contrast AF operation is completed, that is, the focus lens has been moved to a certain position in accordance with the maximal contrast value. With the contrast AF not completed (No in step S324), the flow returns to step S322 to determine whether or not to perform the sub frame display again.

Figure 4:
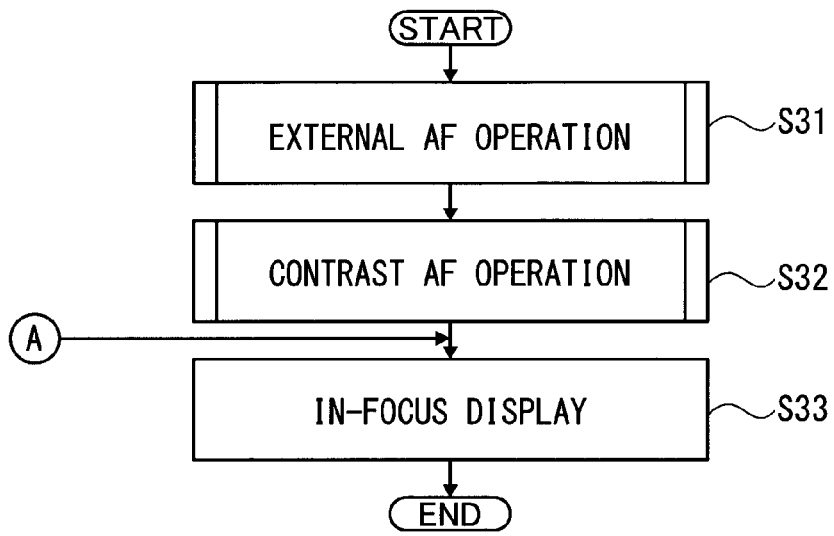
FIG. 4 is a flowchart for the AF process of the imaging operation by way of example.

Upon the completion of the contrast AF (Yes in step S324), the flow returns to step S33 in FIG. 4 to display the in-focus indication on the subject image on the LCD 9. The in-focus indication refers to an indication to notify a user that the AF process is completed and the camera is now ready for shooting.

Returning to FIG. 3, after the AF process in step S3, a determination is made on whether or not the shutter button 2 is full-pressed (RL2) in step S4. When the full-press to the shutter button 2 is detected (Yes in step S4), a shooting operation is conducted in step S5. Upon completion of the shooting, the preview operation is resumed in step S6.

In step S6 the image preview on the LCD 9 is resumed by resuming reading images from the main optical system 17 and stopping reading images from the sub optical system 16.

Upon detection of the half-press (RL1) (Yes in step S7) instead of the full-press (RL2) (No in step S4), the in-focus indication is continuously displayed. With no detection of RL1 (No in step S7), the image preview is resumed in step S6.

As described above, the imaging device according to the present embodiment can continuously display a subject image on the LCD 9 without stopping the image preview, while partially reading image data in order to perform the contrast AF operation at a higher speed.

Moreover, the imaging device according to the present embodiment can easily track the motion of a subject in the contrast AF process.

Although the present invention has been described in terms of exemplary embodiments, it is not limited thereto. It should be appreciated that variations or modifications may be made in the embodiments described by persons skilled in the art without departing from the scope of the present invention as defined by the following claims.

The invention claimed is:

1. An imaging device which determines an in-focus position by contrast autofocus, comprising:
   a first optical system including a first lens and a first image sensor;
   a second optical system including a second lens and a second image sensor;
   a signal processing unit configured to read an image signal from at least one of the first image sensor and the second image sensor, and generate an image for display; and
   a display to display the generated image, wherein
   in the contrast autofocus, the signal processing unit is configured to read a part of the image signal from the first image sensor and calculate a contrast value based on the read part of the image signal, and generate the image for display from the image signal read from the second image sensor, wherein
   the signal processing unit is configured to generate the image in the contrast autofocus by synthesizing the image signal read from the first image sensor with the image signal read from the second image sensor.

2. The imaging device according to claim 1, wherein the signal processing unit is configured to stop generating the image from the image signal read from the first image sensor.

3. The imaging device of claim 2, wherein
   in the contrast autofocus, the signal processing unit is configured to determine whether or not a focal length of the first optical system is longer than a predetermined value, and generate the image from the image signal read from the second image sensor when the focal length of the first optical system is longer than the predetermined value.

4. The imaging device of claim 2, wherein
   in the contrast autofocus, the signal processing unit is configured to determine whether or not a process time for the contrast autofocus is longer than a predetermined time, and generate the image from the image signal read from the second image sensor when the process time is longer than the predetermined time.

5. The imaging device according to claim 1, wherein
   in the contrast autofocus, the signal processing unit is configured to determine whether or not a focal length of the first optical system is longer than a predetermined value, and generate the image from the image signal read from the second image sensor when the focal length of the first optical system is longer than the predetermined value.

6. The imaging device of claim 1, wherein
   in the contrast autofocus, the signal processing unit is configured to determine whether or not a process time for the contrast autofocus is longer than a predetermined time, and generate the image from the image signal read from the second image sensor when the process time is longer than the predetermined time.

7. An imaging device which determines an in-focus position by contrast autofocus, comprising:
   a first optical system including a first lens and a first image sensor;
   a second optical system including a second lens and a second image sensor;
   a signal processing unit configured to read an image signal from at least one of the first image sensor and the second image sensor, and generate an image for display; and
   a display to display the generated image, wherein
   in the contrast autofocus, the signal processing unit is configured to read a part of the image signal from the first image sensor and calculate a contrast value based on the read part of the image signal, and generate the image for display from the image signal read from the second image sensor,
   the first optical system includes a focus lens, and
   in the contrast autofocus, the signal processing unit is configured to determine whether or not a number of scan steps of the focus lens is larger than a predetermined value, and generate the image from the image signal read from the second image sensor when the number of scan steps is larger than the predetermined value.

8. An imaging device which determines an in-focus position by contrast autofocus, comprising:
   a first optical system including a first lens and a first image sensor;
   a second optical system including a second lens and a second image sensor;
   a signal processing unit configured to read an image signal from at least one of the first image sensor and the second image sensor, and generate an image for display; and
   a display to display the generated image, wherein
   in the contrast autofocus, the signal processing unit is configured to read a part of the image signal from the first image sensor and calculate a contrast value based on the read part of the image signal, and generate the image for display from the image signal read from the second image sensor, and
   in the contrast autofocus, the signal processing unit is configured to determine whether or not a process time for the contrast autofocus is longer than a predetermined time, and generate the image from the image signal read from the second image sensor when the process time is longer than the predetermined time.

9. An imaging method for determining an in-focus position by contrast autofocus, comprising the steps of:
   reading an image signal from at least one of a first image sensor and a second image sensor, and generating an image for display;
   displaying the generated image; and
   in the contrast autofocus, reading a part of the image signal from the first image sensor and calculating a contrast value based on the read part of the image signal, and generating the image for display from the image signal read from the second image sensor, wherein in the contrast autofocus, the generating step comprises generating the image by synthesizing the image signal read from the first image sensor with the image signal read from the second image sensor.

\* \* \* \* \*